(12) United States Patent
Choo

(10) Patent No.: US 8,332,706 B2
(45) Date of Patent: Dec. 11, 2012

(54) TRANSPORT LAYER CONTROL DEVICE, METHOD FOR TRANSMITTING PACKET, AND METHOD FOR RECEIVING PACKET

(75) Inventor: Ho-Cheol Choo, Seoul (KR)

(73) Assignee: Pantech & Curitel Communications, Inc., Seoul (KR)

( * ) Notice: Subject to any disclaimer, the term of this patent is extended or adjusted under 35 U.S.C. 154(b) by 738 days.

(21) Appl. No.: 12/556,331

(22) Filed: Sep. 9, 2009

(65) Prior Publication Data

US 2010/0235701 A1     Sep. 16, 2010

(30) Foreign Application Priority Data

Mar. 16, 2009   (KR) .................. 10-2009-0022356

(51) Int. Cl.
     *H04L 1/18*   (2006.01)
(52) U.S. Cl. ....................... 714/748; 370/469
(58) Field of Classification Search .............. 370/352, 370/486, 469; 398/52; 707/101; 709/228; 714/748
See application file for complete search history.

(56) References Cited

U.S. PATENT DOCUMENTS

| | | | |
|---|---|---|---|
| 7,580,402 B2 * | 8/2009 | Masuhiro et al. | 370/352 |
| 2003/0120802 A1 | 6/2003 | Kohno | |
| 2005/0123001 A1 * | 6/2005 | Craven et al. | 370/486 |
| 2005/0185604 A1 | 8/2005 | Agarwal | |
| 2005/0207443 A1 * | 9/2005 | Kawamura et al. | 370/469 |
| 2007/0112811 A1 * | 5/2007 | Shen et al. | 707/101 |
| 2008/0317465 A1 * | 12/2008 | Yu | 398/52 |
| 2009/0089440 A1 * | 4/2009 | Gathman | 709/228 |

FOREIGN PATENT DOCUMENTS

| | | |
|---|---|---|
| KR | 10-2004-0024629 | 3/2004 |
| KR | 10-2006-0096623 | 9/2006 |

\* cited by examiner

*Primary Examiner* — David Ton
(74) *Attorney, Agent, or Firm* — H.C. Park & Associates, PLC

(57) ABSTRACT

A transport layer control device includes a controller to establish or release a transmission control protocol (TCP) connection and to process retransmission of a lost packet using TCP, and a packet processor to number packets and to process transmission of the numbered packets using a user datagram protocol (UDP). A method for transmitting a packet includes establishing the TCP connection with a receiving device, numbering packets and transmitting the numbered packets to the receiving device using UDP, and retransmitting a lost packet to the receiving device using TCP in response to a retransmission request for the lost packet. A method for receiving a plurality of packets includes establishing the TCP connection, receiving numbered packets using UDP, requesting retransmission of a lost packet using TCP, and receiving the lost packet through TCP.

17 Claims, 5 Drawing Sheets

TRANSPORT LAYER CONTROL DEVICE, METHOD FOR TRANSMITTING PACKET, AND METHOD FOR RECEIVING PACKET

CROSS-REFERENCE TO RELATED APPLICATION

This application claims priority from and the benefit of Korean Patent Application No. 10-2009-22356, filed on Mar. 16, 2009, which is hereby incorporated by reference for all purposes as if fully set forth herein.

BACKGROUND OF THE INVENTION

1. Field of the Invention

The following description relates to transport layer control technology of an Internet protocol, and more particularly, to a transport layer control device, a method for transmitting a packet, and a method for receiving a packet using both transmission control protocol (TCP) and user datagram protocol (UDP) characteristics.

2. Discussion of the Background

FIG. 1 shows a hierarchical structure of an Internet protocol. As shown in FIG. 1, the Internet protocol includes five layers: a physical layer, a data link layer, a network layer, a transport layer, and an application layer. Thus, the Internet protocol differs from an open systems interconnect (OSI)-7 layer model.

As representative protocols of the transport layer, there are a transmission control protocol (TCP) and a user datagram protocol (UDP). The TCP is a protocol in which a lost packet is re-transmitted to a receiving device, so that more reliable packet transmission is performed. That is, the TCP is a connection-oriented protocol designed to perform a re-transmission mechanism and a congestion control mechanism under the assumption that a transmission error such as packet loss occurs due to a network error.

The UDP is a connectionless protocol, does not perform a complicated control operation such as retransmission or congestion control, does not perform a response acknowledge operation, and merely provides a UDP header error detection function, which is a minimum error control function. Therefore, the UDP does not guarantee reliability of packet transmission. However, the UDP may improve a transmission rate and transmission efficiency relative to TCP due to its simpler operating characteristics.

That is, the TCP may provide better reliability but has lower transmission efficiency, while the UDP may provide a higher data transmission rate but does not guarantee reliability. Due to such characteristics, the TCP is generally used in applications that require more reliable packet transmission such as file transfer protocol (FTP), while the UDP is generally used in applications that require a constant transmission rate even though some packets may be lost. But there is no single protocol or transmission/reception method that offers the benefits of both TCP and UDP.

SUMMARY OF THE INVENTION

Exemplary embodiments of the present invention provide a transport layer control device in which the advantages of both TCP, which may provide more reliable data transmission, and UDP, which may provide a higher data transmission rate, are combined.

Exemplary embodiments of the present invention also provide a method for transmitting a packet in which the advantages of both TCP, which may provide more reliable data transmission, and UDP, which may provide a higher data transmission rate, are combined.

Exemplary embodiments of the present invention also provide a method for receiving a packet in which the advantages of both TCP, which may provide more reliable data transmission, and UDP, which may provide a higher data transmission rate, are combined.

Additional aspects of the invention will be set forth in the description which follows, and in part will be apparent from the description, or may be learned by practice of the invention.

An exemplary embodiment of the present invention discloses a transport layer control device to transmit or receive a plurality of packets. The transport layer control device includes a controller to establish or release a transmission control protocol (TCP) connection and to process retransmission of lost packets using TCP, and a packet processor to number packets and to process transmission of the numbered packets using a user datagram protocol (UDP).

An exemplary embodiment of the present invention discloses a method for transmitting a plurality of packets. The method includes establishing a transmission control protocol (TCP) connection with a receiving device, if the TCP connection is established, numbering packets and transmitting the numbered packets to the receiving device using a user datagram protocol (UDP), retransmitting a lost packet to the receiving device using TCP in response to a retransmission request for the lost packet from the receiving device, and releasing the TCP connection in response to a data receiving completion notification message from the receiving device.

An exemplary embodiment of the present invention discloses a method for receiving a plurality of packets. The method includes establishing a transmission control protocol (TCP) connection with a transmitting device, if the TCP connection is established, receiving numbered packets using a user datagram protocol (UDP), requesting retransmission of a lost packet of the plurality of packets using TCP, and receiving the lost packet through TCP, and transmitting a data receiving completion notification message if the plurality of packets are received.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF THE ILLUSTRATED EMBODIMENTS

Figure 1:
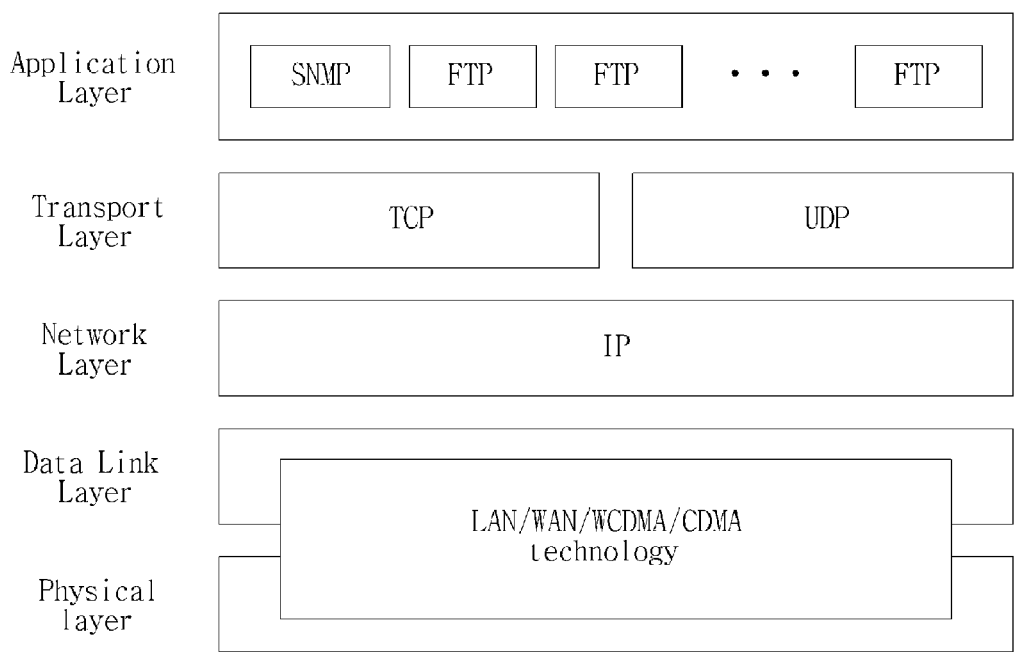
FIG. 1 shows a hierarchical structure of an Internet protocol.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Figure 2:
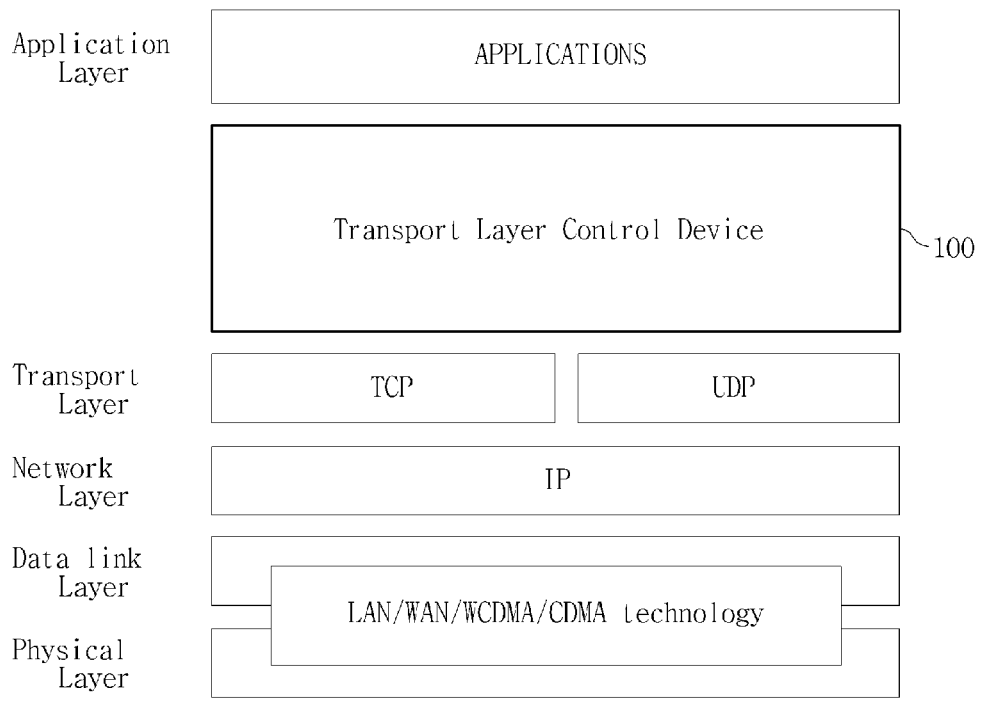
FIG. 2 shows an arrangement of a transport layer control device in a hierarchical structure of an Internet protocol according to an exemplary embodiment of the present invention.

FIG. 2 shows an arrangement of a transport layer control device in a hierarchical structure of an Internet protocol according to an exemplary embodiment of the present invention. As shown in FIG. 2, a transport layer control device 100 is arranged between a transport layer and an application layer in the hierarchical structure of the Internet protocol and uses the UDP for general data transmission and the TCP for connection control, response control, and data retransmission.

Figure 3:
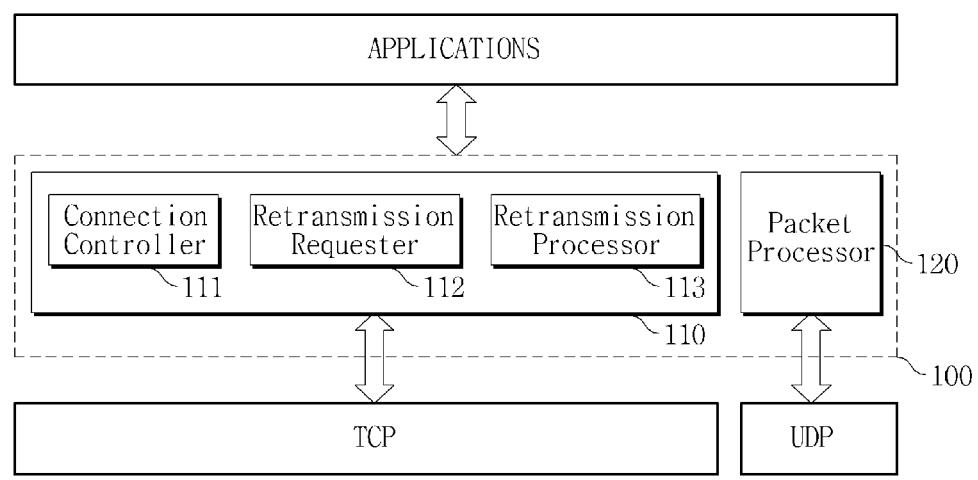
FIG. 3 is a block diagram of a transport layer control device according to an exemplary embodiment of the present invention.

FIG. 3 is a block diagram of a transport layer control device according to an exemplary embodiment of the present invention. As shown in FIG. 3, the transport layer control device 100 includes a controller 110 and a packet processor 120.

The controller 110 establishes or releases a TCP connection and performs retransmission processing of a lost packet using the TCP. That is, the controller 110 processes connection control, response control, and data retransmission using the TCP. The controller 110 uses the TCP because data reliability may be better provided in operations such as connection control, response control, and data retransmission.

The packet processor 120 numbers packets and processes transmission of the numbered packets using the UDP. That is, the packet processor 120 processes general data transmission using the UDP. The packet processor 120 uses the UDP because a transmission rate may be more important than reliability when transmitting a large number of packets, and a transmission error can be corrected through retransmission if a packet is lost.

Therefore, in the transport layer control device 100, the packet processor 120 transmits a packet to a receiving device using the UDP, and the controller 110 retransmits a lost packet using the TCP if the receiving device requests retransmission of a lost packet. Thus, the transport layer control device 100 can better provide both a transmission rate and transmission reliability.

The controller 110 includes a connection controller 111, a retransmission requester 112, and a retransmission processor 113. The controller 110 establishes or releases a TCP connection and processes retransmission of a lost packet using the TCP using the connection controller 111, the retransmission requester 112, and the retransmission processor 113.

The connection controller 111 establishes or releases a TCP connection. If the application layer requests data transmission, the connection controller 111 of a transmitting device attempts to establish a TCP connection with a receiving device. If a TCP connection is successfully established, the connection controller 111 transmits a transmission control information request message including a transmission data size, a transmission rate, and a UDP port to the receiving device through the TCP and receives a transmission control information request response message from the receiving device.

The connection controller 111 of the receiving device receives the transmission control information request message transmitted from the transmitting device, and transmits the transmission control information request response message to the transmitting device. The connection controller 111 of the receiving device also sends a data receiving preparation message including the UDP port indicated in the transmission control information request message to the packet processor 120 of the receiving device.

If the transmission control information request response message is received from the receiving device, the connection controller 111 of the transmitting device transmits a data transmission request message to the packet processor 120 of the transmitting device and is on standby to receive a retransmission request message or a data receiving completion notification message from the receiving device. The data transmission request message includes a UDP port number which is to be opened, a transmission rate, and transmission data information.

If the data transmission request message is received from the connection controller 111, the packet processor 120 of the transmitting device opens a UDP port indicated in the data transmission request message, numbers packets sequentially, and transmits the numbered packets to the receiving device through the opened UDP port.

The packet processor 120 may control a packet transmission rate with reference to the transmission rate indicated in the data transmission request message.

If a retransmission request message is received from the receiving device, the connection controller 111 of the transmitting device sends a retransmission request message for a lost packet to the retransmission processor 113 of the transmitting device.

If a data receiving completion notification message is received from the receiving device, the connection controller 111 of the transmitting device checks whether there is more data to be transmitted, and releases the TCP connection if there is no more data to be transmitted.

If all of the transmitted packets are received from the transmitting device, the connection controller 111 of the receiving device transmits the data receiving completion notification message to the transmitting device and releases the TCP connection.

As described above, the connection controller 111 establishes the TCP connection for transmitting data packets and releases the TCP connection when data transmission is completed.

The retransmission requester 112 of a receiving device detects a packet lost during transmission using numbering information of received packets and requests a transmitting device to retransmit the lost packet. The transmitting device performs numbering of packets through the packet processor 120 and sequentially transmits the numbered packets to the receiving device using UDP.

The retransmission processor 113 processes retransmission of a corresponding packet using the TCP in response to a retransmission request for the lost packet from the retransmission requester 112 of the receiving device. When the receiving device requests retransmission of a lost packet, the transmitting device retransmits a corresponding packet, which is requested to be retransmitted, using the TCP through the retransmission processor 113.

The retransmission processor 113 of the receiving device receives the lost packet retransmitted from the transmitting device and performs packet reassembling to add a packet lost during transmission, thereby correcting a transmission error occurring during data transmission.

According to an exemplary embodiment, the TCP and the UDP are combined to incorporate each protocol's advantages into data transmission. Specifically, UDP is used for general data transmission, and the TCP is used for connection control, response control, and data retransmission.

Figure 4:
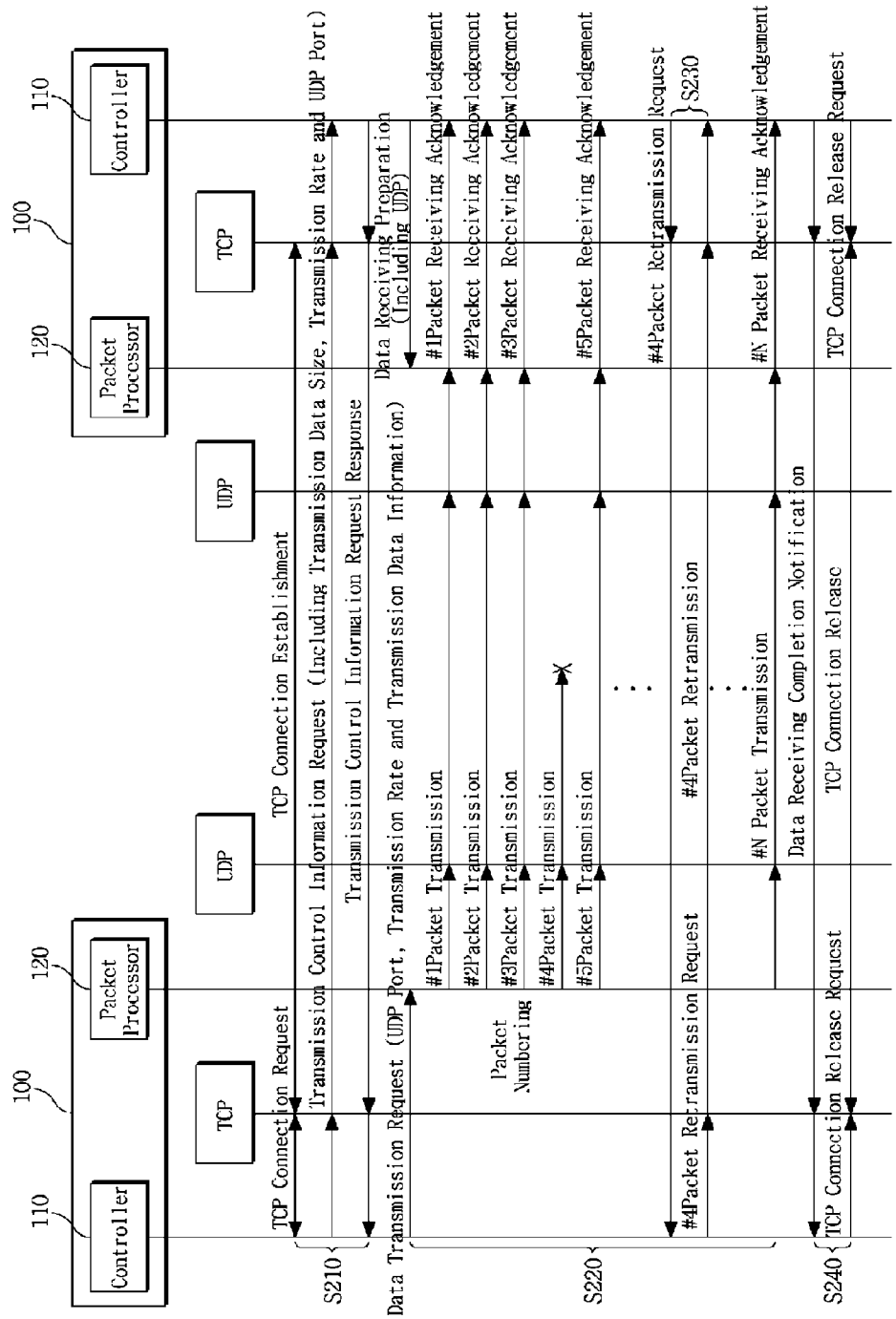
FIG. 4 is a flowchart illustrating a method for transmitting a packet according to an exemplary embodiment of the present invention.

A data packet transmission operation and a retransmission operation according to an exemplary embodiment of the present invention will be described below with reference to FIG. 4. FIG. 4 is a flowchart illustrating a method for transmitting a packet according to an exemplary embodiment of the present invention.

If the application layer requests data transmission, the transmitting device establishes a TCP connection with the receiving device (S210). The controller 110 of the transport layer control device 100 at the transmitting device side requests the TCP of the transport layer to establish a TCP connection, and so a connection between the TCP of the transmitting device side and the TCP of the receiving device side is established.

Once the TCP of the transmitting device side is connected with the TCP of the receiving device side, the transmitting device transmits the transmission control information request message to the receiving device using the connected TCP. The transmission control information request message includes a transmission data size, a transmission rate, and a UDP port.

The receiving device, which has received the transmission control information request message from the transmitting device, checks the transmission data size, the transmission rate, and the UDP port, may modify them to be suitable for a condition and performance of the receiving device side, and transmits the transmission control information request response message to the transmitting device. The data receiving preparation message including a UDP port may also be sent to the packet processor 120 of the receiving device.

Then, the transmitting device numbers the packets, and transmits the numbered packets to the receiving device using the UDP (S220). The steps of numbering packets and transmitting numbered packets of operation S220 will now be described in more detail.

First, the transmitting device, which has received the transmission control information request response message from the receiving device, transmits a data transmission request message including a UDP port number to be opened, a transmission rate, and transmission data information to the packet processor 120 through the controller 110 of the transport layer control device 100 at the transmitting device side.

Then, the packet processor 120n which has received the data transmission request message from the controller 110 at the transmitting device side, opens the UDP port indicated in the data transmission request message, numbers transmission packets sequentially, and transmits the numbered packets to the receiving device through the opened UDP port. The packet processor 120 may control a packet transmission rate with reference to the transmission rate indicated in the data transmission request message.

The receiving device determines whether a packet is lost during transmission using numbering information of the received packets through the controller 110. If the controller 110 of the receiving device determines that a packet is lost, the receiving device requests the transmitting device to retransmit the lost packet. As an example, a packet #4 is lost during transmission as shown in FIG. 4.

If the receiving device determines that a packet, such as packet #4, is lost during transmission in operation S220, the receiving device transmits a retransmission request for the lost packet to the transmitting device (S230). The controller 110 of the transmitting device that has received the retransmission request for the lost packet from the receiving device then retransmits the lost packet to the receiving device using the TCP in response to the retransmission request.

When all of the packets transmitted from the transmitting device are received by the receiving device, the receiving device transmits a data receiving completion notification message to the transmitting device through the controller 110 of the transport layer control device 100 using the TCP and requests the transmitting device to release the TCP connection.

The transmitting device receives the data receiving completion notification message from the receiving device and checks whether there is any more data to be transmitted through the controller 110 of the transport layer control device 100. If not, then the transmitting device releases the TCP connection (S240).

As described above, the UDP is used for general data transmission, and the TCP is used for connection control, response control, and data retransmission. Accordingly, transmission rate and transmission reliability may be better provided in data transmission.

Figure 5:
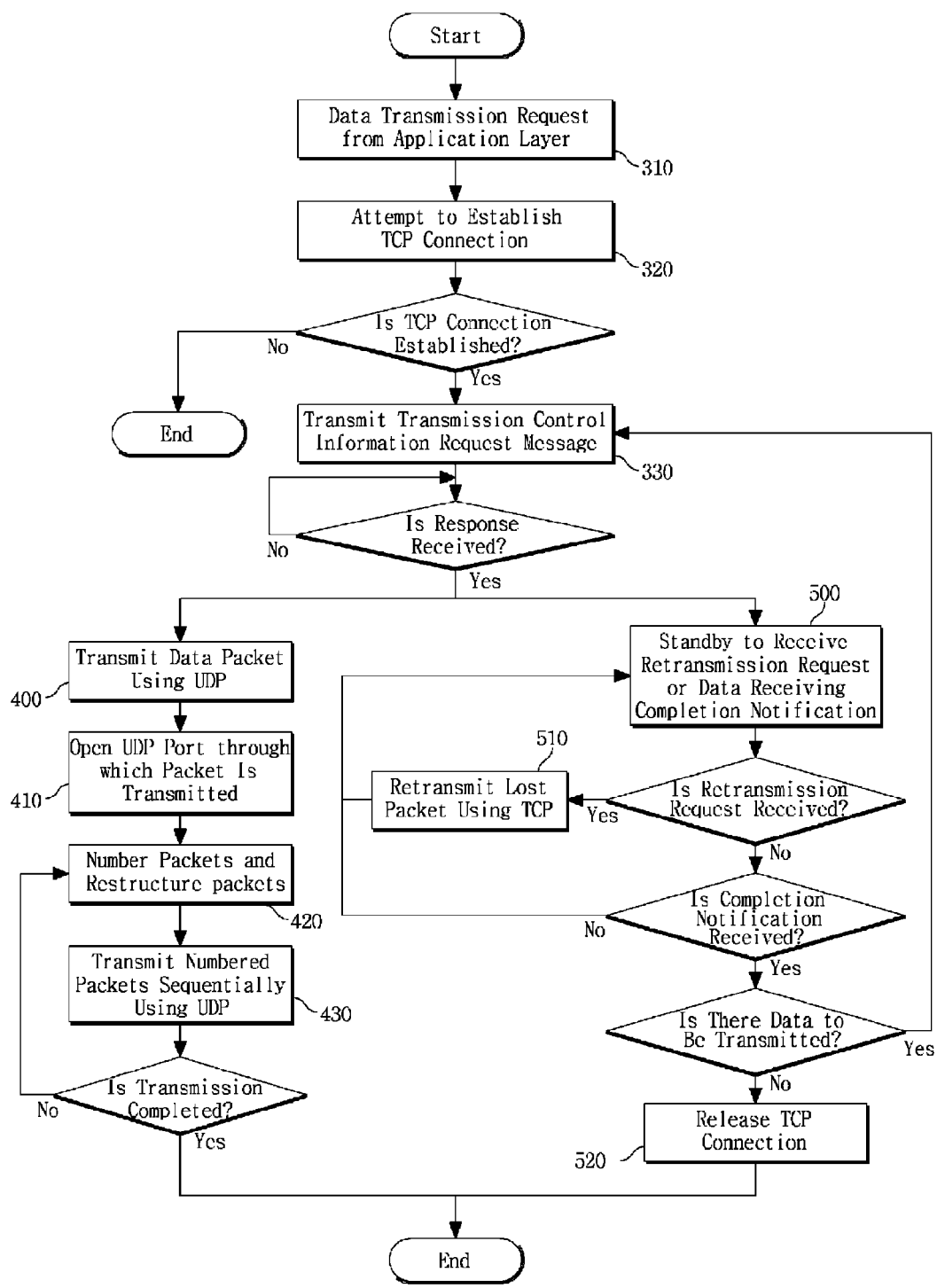
FIG. 5 is a flowchart illustrating operation of a transport layer control device at a transmitting device side according to an exemplary embodiment of the present invention.

FIG. 5 is a flowchart illustrating operation of a transport layer control device at the transmitting device side according to an exemplary embodiment of the present invention. Referring to FIG. 5, if the application layer requests data transmission (S310), the transport layer control device 100 attempts to establish a TCP connection with the receiving device (S320).

If the TCP connection with the receiving device side is successfully established, the transmitting device transmits the transmission control information request message to the receiving device using the connected TCP (S330). The transmission control information request message may include a transmission data size, a transmission rate, and a UDP port.

The transmitting device receives the transmission control information request response message from the receiving device, which has received the transmission control information request message, starts to transmit data packets using the UDP (S400) and is on standby to receive a retransmission request message or a data receiving completion notification message from the receiving device (S500).

For operation S400, the transmitting device opens a UDP port through which a packet is to be transmitted (S410), restructures packets through numbering of packets (S420), transmits the numbered packets to the receiving device sequentially using the UDP (S430), and finishes its operation when all of packets are transmitted.

If a retransmission request message for a lost packet is received from the receiving device in the standby state (S500) for receiving the retransmission request message or the data receiving completion notification message, the transmitting device retransmits the lost packet to the receiving device using the TCP (S510).

If the data receiving completion notification message is received from the receiving device in the standby state (S500) for receiving the retransmission request message or the data receiving completion notification message, the transmitting device checks whether there is any more data to be transmitted. If not, the transmitting device releases the TCP connection (S520). Accordingly, the transport layer control device at the transmitting device side performs data transmission that may use advantages of both UDP and TCP.

Figure 6:
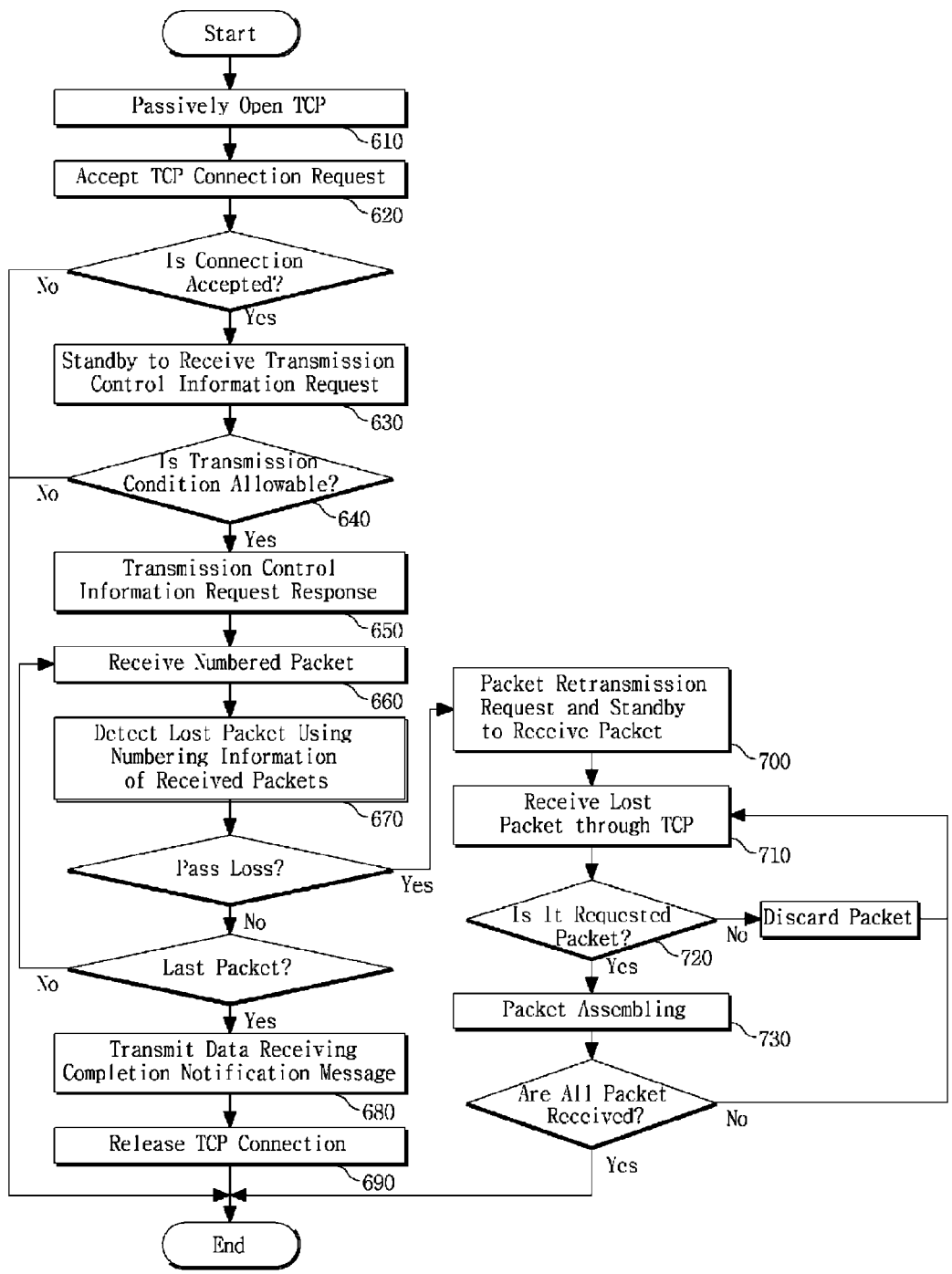
FIG. 6 is a flowchart illustrating operation of a transport control device at a receiving device side according to an exemplary embodiment of the present invention.

FIG. 6 is a flowchart illustrating operation of a transport layer control device at the receiving device side according to an exemplary embodiment of the present invention. The transport control device at the receiving device side passively opens the TCP to receive a connection request from the transmitting device side (S610), accepts the TCP connection request from the transmitting device (S620), and is on standby to receive the transmission control information request message (S630).

If the transmission control information request message is received from the transmitting device, the receiving device determines whether transmission conditions included in the transmission control information request are allowable (S640). The receiving device may modify the transmission conditions to be suitable for a condition and performance of the receiving device side and transmits the transmission control information request response message to the transmitting device (S650). The transmission control information request response message may include the modified transmission conditions. Then, the receiving device opens the UDP port and is on standby to receive data.

Thereafter, if numbered packets are received through the opened UDP port from the transmitting device (S660), the receiving device checks whether there is a packet lost during transmission using numbering information of the received packets (S670). If there is a lost packet, the receiving device requests the transmitting device to retransmit the lost packet and is on standby to receive a packet which is requested to be requested (S700).

The receiving device determines whether a packet transmitted from the transmitting device is the last packet. If it is determined that all of packets are received, the receiving device transmits the data receiving completion notification message to the transmitting device using the TCP (S680) and releases the TCP connection (S690).

Meanwhile, if a lost packet is received from the transmitting device through the TCP in the standby state for receiving a retransmitted packet (S710), it is determined whether the received packet is a packet that was requested to be retransmitted (S720). If the received packet is not the packet that was requested to be retransmitted, the received packet is discarded. If the received packet is the packet that was requested to be retransmitted, packet reassembling is performed (S730) to add the packet lost during transmission, thereby correcting a transmission error occurring during data transmission. If all packets that were requested to be retransmitted are received, the retransmission operation is finished.

Accordingly, the transport layer control device at the receiving device side performs the data receiving operation that may include advantages of both UDP and TCP.

As apparent from the above description, a transport layer is controlled to use the UDP for general data transmission and the TCP for connection control, response control, and data retransmission, which may improve performance of the transport layer.

The present invention can be implemented as computer readable codes in a computer readable recording medium that, when executed, performs a data transmission or data receiving method as described above. The computer readable recording medium includes all types of record media in which computer readable data are stored. Examples of the computer readable recording medium include a ROM, a RAM, a CD-ROM, a magnetic tape, a floppy disk, and optical data storage. Further, the recording medium may be implemented in the form of a carrier wave such as Internet transmission. In addition, the computer readable record medium may be distributed to computer systems over a network, in which computer readable codes may be stored and executed in a distributed manner.

According to exemplary embodiments of the present invention, a transport layer is is controlled to use the UDP for general data transmission and the TCP for connection control, response control, and data retransmission. Thereby, the data transmission/receiving operation may include advantages of both UDP and TCP.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A transport layer control device to transmit or receive a plurality of packets, comprising:
   a controller to establish or release a transmission control protocol (TCP) connection and to process retransmission of lost packets using TCP; and
   a packet processor to number packets and to process transmission of the numbered packets using a user datagram protocol (UDP).

2. The transport layer control device of claim 1, wherein the controller comprises:
   a connection controller to establish or release the TCP connection with a transmitting device or a receiving device;
   a retransmission requester to detect a first lost packet using numbering information of received packets and to request the transmitting device to retransmit the first lost packet; and
   a retransmission processor to process retransmission of a second lost packet that is requested to be retransmitted using TCP in response to a retransmission request for the second lost packet from the receiving device.

3. The transport layer control device of claim 2, wherein the connection controller attempts to establish the TCP connection with the receiving device, transmits a transmission control information request message to the receiving device using TCP if the TCP connection is successfully established, and receives a transmission control information request response message from the receiving device,
   wherein the transmission control information request message comprises a transmission data size, a transmission rate, and a UDP port.

4. The transport layer control device of claim 3, wherein the connection controller transmits a data transmission request message to the packet processor if the transmission control information request response message is received from the receiving device, and stands by to receive a retransmission request message or a data receiving completion notification message from the receiving device,
   wherein the data transmission request message comprises the UDP port to be opened, a transmission rate, and transmission data information.

5. The transport layer control device of claim 4, wherein if the retransmission request message is received from the receiving device, the connection controller transmits a retransmission request message for the second lost packet to the retransmission processor.

6. The transport layer control device of claim 4, wherein if the data receiving completion notification message is received from the receiving device, the connection controller checks whether there is additional data to be transmitted to the receiving device, and releases the TCP connection if there is no additional data to be transmitted to the receiving device.

7. The transport layer control device of claim 4, wherein if the data transmission request message is received from the connection controller, the packet processor opens the UDP port indicated in the data transmission request message, numbers packets sequentially, and transmits the numbered packets to the receiving device through the opened UDP port.

8. The transport layer control device of claim 4, wherein the packet processor controls a packet transmission rate with reference to the transmission rate included in the data transmission request message.

9. The transport layer control device of claim 2, wherein the connection controller receives a transmission control information request message transmitted from the transmitting device, transmits a transmission control information request response message to the transmitting device, and transmits a data receiving preparation message including a UDP port to the packet processor,
wherein the transmission control information request message comprises a transmission data size, a transmission rate, and the UDP port.

10. The transport layer control device of claim 9, wherein if the plurality of packets transmitted from the transmitting device are received, the connection controller transmits a data receiving completion notification message to the transmitting device and releases the TCP connection.

11. The transport layer control device of claim 2, wherein the retransmission processor receives the first lost packet retransmitted from the transmitting device and performs packet reassembling of the first lost packet.

12. A method for transmitting a plurality of packets, comprising:
establishing a transmission control protocol (TCP) connection with a receiving device;
if the TCP connection is established, numbering packets and transmitting the numbered packets to the receiving device using a user datagram protocol (UDP);
retransmitting a lost packet to the receiving device using TCP in response to a retransmission request for the lost packet from the receiving device; and
releasing the TCP connection in response to a data receiving completion notification message from the receiving device.

13. The method of claim 12, wherein transmitting the numbered packets comprises opening a UDP port through which the packets are to be transmitted, numbering the packets sequentially, and transmitting the numbered packets to the receiving device through the opened UDP port.

14. The method of claim 12, wherein establishing the TCP connection comprises transmitting a transmission control information request message, the transmission control information request message comprising transmission data size, transmission rate, and UDP port.

15. A method for receiving a plurality of packets, comprising:
establishing a transmission control protocol (TCP) connection with a transmitting device;
if the TCP connection is established, receiving numbered packets using a user datagram protocol (UDP);
requesting retransmission of a lost packet of the plurality of packets using TCP, and receiving the lost packet through TCP; and
transmitting a data receiving completion notification message if the plurality of packets are received.

16. The method of claim 15, further comprising:
if the lost packet is received in response to the retransmission request, reassembling the plurality of packets.

17. The method of claim 15, wherein establishing the TCP connection comprises:
receiving a transmission control information request message, the transmission control information request message comprising transmission data size, transmission rate, and UDP port;
determining whether transmission conditions included in the transmission control information request are allowable;
modifying at least one of the transmission data size, the transmission rate, and the UDP port if the transmission conditions are not allowable;
transmitting a transmission control information request response message to the transmitting device; and
opening the UDP port to receive packets.

* * * * *